United States Patent [19]

Personette

[11] Patent Number: 5,055,139

[45] Date of Patent: Oct. 8, 1991

[54] REMOVAL OF A POLYMERIC COATING FROM A POLYESTER SUBSTRATE

[75] Inventor: David L. Personette, Slaughterville, Okla.

[73] Assignee: Morris Resources, Inc., Noble, Okla.

[21] Appl. No.: 551,763

[22] Filed: Jul. 11, 1990

[51] Int. Cl.$^5$ .......................... B08B 3/08; B08B 3/10; B08B 7/02

[52] U.S. Cl. ................................ 134/22.17; 252/156; 252/135

[58] Field of Search ..................... 134/22.17; 252/156, 252/135

[56] References Cited

U.S. PATENT DOCUMENTS

| | | | |
|---|---|---|---|
| 3,308,066 | 3/1967 | Murphy et al. | 252/156 |
| 3,766,076 | 10/1973 | Murphy | 252/156 |
| 3,865,628 | 2/1975 | Callahan et al. | 134/22.17 |
| 3,980,587 | 9/1976 | Sullivan | 252/156 |
| 4,451,264 | 5/1984 | Ulry et al. | 8/679 |

Primary Examiner—Theodore Morris
Assistant Examiner—Zeinab El-Arini
Attorney, Agent, or Firm—Glen M. Burdick; Bill D. McCarthy

[57] ABSTRACT

A method for removing a polymeric coating, such as a polyvinyl dichloride, latex, synthetic latex and mixtures thereof from a polymeric-coated polyester substrate, is provided. The method comprises contacting the polymeric-coated polyester substrate with an aqueous solution containing at least about 0.75 weight percent trisodium phosphate and at least about 0.75 weight percent of an alkali metal hydroxide for a period of time effective to remove the polymeric coating and produce a polyester substrate substantially free of the polymeric coating. The polyester substrate and the polymeric constituents of the coating, once separated, can be recovered for recycling. A composition for removing the polymeric coating is also provided.

21 Claims, 1 Drawing Sheet

5,055,139

REMOVAL OF A POLYMERIC COATING FROM A POLYESTER SUBSTRATE

BACKGROUND OF THE INVENTION

1. Field of the Invention

The present invention relates generally to a method for removing a polymeric coating from a polyester substrate, and more particularly but not by way of limitation, to a method for removing a coating of polyvinyl dichloride, latex, synthetic latex and mixtures thereof from a polyester substrate.

2. Brief Description of the Prior Art

Polymeric-coated substrates, especially polyvinyl dichloride-coated polyester substrates, have found wide acceptance in the food industry for packaging and preserving of food products and as imaging films. Accordingly, millions of pounds of such substrates are produced each year, such production resulting in overruns, endruns, and defective products.

Heretofore, the excess polymeric-coated polyester substrates have been disposed of in landfills. However, because such polymeric-coated polyester substrates are substantially nondegradable, efforts are underway to prevent the disposal of such substrates in landfills. Therefore, a need exists for an improved method for the disposal of polymeric-coated polyester substrates, which is environmentally sound and which does produce a less hazardous work environment for workers involved in the disposal process. It is to such a method that the present invention is directed.

SUMMARY OF THE INVENTION

The present invention relates to a method for removing polymeric coatings formulated from polyvinyl dichloride, latex, synthetic latex and mixtures thereof from a polyester substrate. In one aspect, the present invention relates to an improved aqueous solution for use in the removal of a polymeric coating from polyester substrates.

Broadly, the method for removing polymeric coatings from a polyester substrate comprises contacting the polymeric-coated polyester substrate with an aqueous solution containing at least about 0.75 weight percent trisodium phosphate and at least about 0.75 weight percent of an alkali metal hydroxide for a period of time effective to remove the polymeric coating and provide a polyester substrate. The polyester substrate and the polymeric coating, once separated, can be recovered for recycling.

The conditions at which the aqueous solution is maintained during contact with the polymeric-coated polyester substrate can vary widely. However, desirable results can be obtained when the aqueous solution is maintained at a temperature of from about 160° F. to about 215° F. during contact with the polymeric-coated polyester substrate; and the polymeric-coated polyester substrate is maintained in contact with the heated aqueous solution for a period of time of at least about 30 seconds, and more desirably from about 30 seconds to about one hour.

An object of the present invention is to provide an improved method for removing polymeric coatings from a polyester substrate.

Another object of the present invention is to provide a method for removing coatings of polyvinyl dichloride, latex, synthetic latex and mixtures thereof from a polyester substrate.

Another object of the present invention, while achieving the before stated objects, is to provide an improved method for reclaiming polyester from a polymeric-coated polyester substrate which exposes workers to less hazardous work conditions.

Another object of the present invention, while achieving the before stated objects, is to provide a method for reclaiming and recycling a polyester substrate from a polyvinyl dichloride-coated polyester substrate.

Other objects, advantages and features of the present invention will become apparent from the following detailed description of the drawing when read in conjunction with the appended claims.

DETAILED DESCRIPTION

Figure 1:
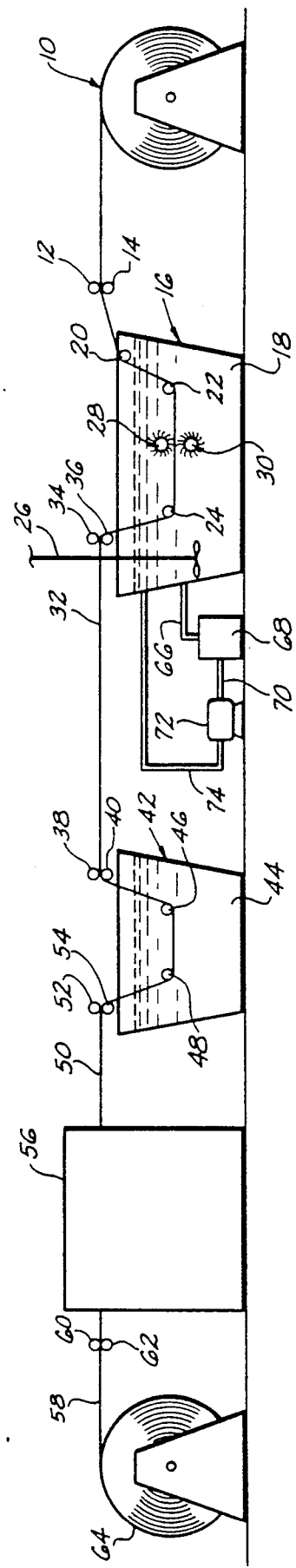
FIG. 1 is a schematic illustration depicting a method for removing a polymeric coating from a polyester substrate in accordance with the present invention.

The present invention provides an improved method for removing a polymeric coating from a polyester substrate. While any polyester substrate capable of being coated with a polymeric material can be utilized in the practice of the present invention, desirable results have been obtained wherein the polyester substrate is polyethylene terephthalate polyester.

The term polymeric coating as used herein is to be understood to be a coating formulated of polyvinyl dichloride, latex, synthetic latex and mixtures thereof. Such polymeric coatings are well known in the art, as is the method of producing substrates having such a coating.

Broadly, the method for removing a polymeric coating from a polyester substrate of the present invention comprises contacting the polymeric-coated polyester substrate with an effective amount of an aqueous solution containing at least about 0.75 weight percent trisodium phosphate and at least about 0.75 weight percent of an alkali metal hydroxide for a period of time effective to remove the polymeric coating and produce a polyester substrate substantially free of the polymeric coating. The mechanism involved in the removal of the polymeric coating from the polyester substrate is not fully understood, but it is believed that the combination of the trisodium phosphate and the alkali metal hydroxide breaks the adhesive bond between the polymeric coating and the polyester substrate.

In carrying out the method of the present invention for removing the polymeric coating from a polymeric-coated substrate, the polymeric-coated substrate is contacted with the aqueous solution for a period of time effective to insure that the polymeric coating has been completely removed from the substrate. The substrate can then be recovered and recycled for further use. It is also envisioned that the polymeric coating, upon separation from the aqueous solution, can also be recycled.

The period of time in which the polymeric-coated substrate is maintained in contact with the aqueous solution can vary, but will generally be for a period of at least about 30 seconds, and more desirably from about 30 seconds to about 60 minutes. Similarly, the temperature at which the aqueous solution is maintained to enhance removal of the polymeric coating from the substrate can vary widely, but will generally be from about 160° F. to about 215° F.

The amount of trisodium phosphate and alkali metal hydroxide employed in the formulation of the aqueous solution can vary widely and will be dependent, to a large degree, upon the solubility of each of the constituents. However, desirably the trisodium phosphate will be present in the aqueous solution in an amount of from about 0.75 to about 11.25 weight percent and the alkali metal hydroxide will likewise be present in an amount of from about 0.75 to about 11.25 weight percent.

Any suitable alkali metal hydroxide can be employed in the present invention. However, desirable results have been obtained wherein the alkali metal hydroxide is selected from the group consisting of sodium hydroxide, potassium hydroxide and mixtures thereof.

Referring now to the drawing, a method for removing a polymeric coating, such as polyvinyl dichloride from a polyvinyl dichloride-coated substrate, in accordance with the present invention will be described. A roll of a polyvinyl dichloride-coated substrate 10 (i.e., a polyvinyl dichloride-coated polyester substrate) is fed through nip rollers 12, 14 into a treatment vessel 16 for contact with an aqueous solution 18 containing at least about 0.75 weight percent trisodium phosphate and at least about 0.75 weight percent of an alkali metal hydroxide. The polyvinyl dichloride-coated substrate 10 is maintained in contact with the aqueous solution 18 for a period of time effective to remove the polyvinyl dichloride from the substrate.

In order to maintain the polyvinyl dichloride-coated substrate 10 in contact with the aqueous solution 18 in the treatment vessel 16, the treatment vessel 16 is provided with a plurality of guide rollers, such as guide rollers 20, 22 and 24. The treatment vessel 16 is also provided with a stirring mechanism or agitator 26 to agitate the aqueous solution 18. To enhance removal of the polyvinyl dichloride from the substrate during passage through the aqueous solution 18, the treatment vessel 16 may also be provided with brushes 28, 30 for abrading the surface of the substrate 10 and enhancing removal of the polyvinyl dichloride coating therefrom.

After the polyvinyl chloride-coated substrate 10 has been in contact with the aqueous solution 18 for a period of time effective to remove the polyvinyl dichloride therefrom, a substantially polyvinyl dichloride-free substrate 32, is removed from the aqueous solution 18. Upon removal from the aqueous solution 18, the polyvinyl dichloride-free substrate 32 is passed through squeeze rollers 34, 36 to remove residual aqueous solution therefrom. The polyvinyl dichloride-free substrate 32 is then passed from the treatment vessel 16 through guide rollers 38, 40 and into a rinse vessel 42 containing an aqueous rinse solution 44. To insure that the polyvinyl dichloride-free substrate 32 is maintained in contact with the aqueous rinse solution 44, the rinse vessel 42 is provided with a plurality of guide rollers, such as guide rollers 46, 48. A rinsed polyvinyl dichloride-free substrate 50 is then passed from the rinse vessel 42 through squeeze rollers 52, 54 to remove excess rinse solution therefrom; and the rinsed polyvinyl dichloride-free substrate 50 is then passed to a dryer 56 to dry the rinsed polyvinyl dichloride-free substrate 50. Upon exiting the dryer 56, a dried polyvinyl dichloride-free substrate 58 is directed through rollers 60, 62 to a take-up roll 64.

The method for removing a polymeric coating from a substrate, such as the polyvinyl dichloride-coated substrate 10, can be operated as either a continuous process or as a batch process. When operating as a continuous process, it is desirable to separate the polymeric constituents employed in formulating the coating, such as polyvinyl dichloride from the aqueous solution 18 to prevent build-up of the polyvinyl dichloride in the aqueous solution 18. Thus, a fluid outlet conduit 66 is disposed in a lower portion of the treatment vessel 16 and the conduit 66 fluidly communicates with a liquid-solid separator 68, such as a filter. Separated liquid from the liquid-solid separator 68 is directed via a conduit 70 to a pump 72 which in turn communicates with the treatment vessel 16 via a conduit 74. Thus, the aqueous solution containing suspended polymer (such as polyvinyl dichloride) withdrawn from the treatment vessel 16 via the fluid outlet conduit 66 is passed through the liquid-solid separator 68, the conduit 70, the pump 72 and the conduit 74 for recirculation to the treatment vessel 16. The recirculation of the aqueous solution 18, in addition to removing polymeric constituent comprising the coating, functions to provide additional agitation to the aqueous solution 18 in the treatment vessel 16.

In order to more fully describe the inventive concept set forth herein, the following example is given. However, the example is merely illustrative in purpose and is not intended to be limiting upon the inventive concept as set forth in the appended claims.

Example

Aqueous solutions containing 1.5 weight percent trisodium phosphate and 1.5 weight percent sodium hydroxide were heated to temperatures of 170° and 205° F. Polyethylene terephthalate polyester substrates coated with polyvinyl dichloride and having a thickness of about 0.2 mls was contacted with the aqueous solutions for 30 minutes. At the end of the 30-minute contact period, the substrates were removed from the aqueous solutions, rinsed with water and dried. Upon examination, it was determined that the polyethylene terephthalate polyester substrates were substantially free of polyvinyl dichloride.

The above example clearly illustrates the method for removing a polymeric coating from a polyester substrate in accordance with the invention wherein the polymeric constituent of the coating can be safely and economically removed from a polyester substrate by contacting a polymeric-coated polyester substrate with an aqueous solution containing at least about 0.75 weight percent trisodium phosphate and at least about 0.75 weight percent of an alkali metal for a period of time effective to remove the polymeric coating and thereby produce a polyester substrate substantially free of the polymeric coating.

From the foregoing description and example, it is clear that the present invention is well adapted to carry out the objects and attain the ends and advantages as well as those inherent therein. While presently preferred embodiments of the invention have been described for purposes of this disclosure, numerous changes may be made which will readily suggest themselves to those skilled in the art, which changes are encompassed within the spirit of the invention disclosed and as defined in the appended claims.

What is claimed is:

1. A method for reclaiming a polyester substrate from a polymeric-coated polyester substrate by removal of the polymeric coating therefrom wherein the polymeric constituents of the polymeric coating consist essentially of polyvinyl dichloride latex, synthetic latex and mixture thereof, the method comprising:

contacting the polymeric-coated polyester substrate with an aqueous solution containing from about 0.75 to about 11.25 weight percent trisodium phosphate and from about 0.75 to about 11.25 weight percent of an alkali metal hydroxide for a period of time effective to remove the polymeric coating and produce a coating-free polyester substrate; and recovering the coating-free polyester substrate.

2. The method of claim 1 further comprising removing residual aqueous solution from the coating-free polymeric substrate.

3. The method of claim 1 wherein the aqueous solution is maintained at a temperature of from about 160° F. to about 215° F. during contact with the polymeric-coated polymeric substrate.

4. The method of claim 3 wherein the period of time effective to produce the coating-free polymeric substrate is at least about 30 seconds.

5. The method of claim 4 wherein the alkali metal hydroxide is selected from the group consisting of sodium hydroxide and potassium hydroxide.

6. The method of claim 1 further comprising abrading the polymeric-coated polymeric substrate while in contact with the aqueous solution to enhance removal of the polymeric coating.

7. The method of claim 1 further comprising:
passing the coating-free substrate through squeeze rollers to remove residual aqueous solution therefrom;
rinsing the coating-free substrate; and
drying the rinsed, coating-free substrate.

8. The method of claim 1 further comprising agitating the aqueous solution during contact with the polymeric-coating substrate to enhance contact therebetween and to assist in removal of the polymeric coating.

9. The method of claim 1 further comprising filtering the aqueous solution to remove at least a portion of the polymeric constituent of the polymeric coating removed from the polymeric-coated polymeric substrate.

10. A method for reclaiming a polyester substrate from a polyvinyl dichloride-coated substrate by removal of the polyvinyl dichloride coating, the method comprising:

passing the polyvinyl dichloride-coated polyester substrate through a vessel containing an aqueous solution, the aqueous solution maintained at a temperature of at least about 185° F. and containing from about 0.75 to about 11.25 weight percent trisodium phosphate and from about 0.75 to about 11.25 weight percent of an alkali metal hydroxide;

maintaining the polyvinyl dichloride-coated polyester substrate in the aqueous solution for a period of time effective to remove the polyvinyl dichloride coating and provide a substantially polyvinyl dichloride-free polyester substrate;

passing the substantially polyvinyl dichloride-free polyester substrate through a rinse zone to remove residual aqueous solution therefrom; and recovering a rinsed polyvinyl dichloride-free polyester substrate.

11. The method of claim 10 further comprising removing excess aqueous solution from the polyvinyl dichloride-free polymeric substrate prior to passing same through the rinse zone.

12. The method of claim 11 further comprising passing the polyvinyl dichloride-free polymeric substrate from the rinse zone through a drying zone so as to dry the rinsed polyvinyl dichloride-free substrate.

13. The method of claim 10 further comprising:
withdrawing at least a portion of the aqueous solution from the vessel;
passing the withdrawn portion of the aqueous solution through a filter to remove suspended polyvinyl dichloride therefrom; and
recycling the filtered aqueous solution to the vessel.

14. The method of claim 10 wherein the period of time effective to remove the polyvinyl dichloride from the polyvinyl dichloride-coated polymeric substrate is at least about 30 seconds.

15. The method of claim 10 further comprising agitating the aqueous solution during contact of the polyvinyl dichloride-coated substrate with the aqueous solution to enhance contact therebetween.

16. The method of claim 15 wherein the period of time effective to remove polyvinyl dichloride from the polyvinyl dichloride-coated polymeric substrate is from about 30 seconds to about 60 minutes.

17. The method of claim 16 further comprising:
withdrawing at least a portion of the aqueous solution from the vessel;
passing the withdrawn portion of the aqueous solution through a filter to remove suspended polyvinyl dichloride therefrom; and
recycling the filtered aqueous solution to the vessel.

18. The method of claim 10 further comprising abrading the surface of the polyvinyl dichloride-coated substrate during contact with the aqueous solution to enhance removal of the polyvinyl dichloride coating therefrom.

19. An aqueous composition for removing a polyvinyl dichloride coating from a polyvinyl dichloride-coated substrate so as to provide a polyvinyl dichloride-free substrate, the aqueous composition consisting essentially of from about 0.75 to about 11.25 weight percent trisodium phosphate and from about 0.75 to about 11.25 weight percent of an alkali metal hydroxide.

20. The aqueous composition of claim 19 wherein the trisodium phosphate is present in an amount of from about 0.75 to about 11.25 weight percent and the alkali metal hydroxide is present in an amount of from about 0.75 to about 11.25 weight percent.

21. The composition of claim 20 wherein the alkali metal hydroxide is selected from the group consisting of sodium hydroxide, potassium hydroxide and mixtures thereof.

* * * * *